United States Patent [19]

Hirano

[11] Patent Number: 5,084,784
[45] Date of Patent: Jan. 28, 1992

[54] COPYING LENS SYSTEM

[75] Inventor: Hiroyuki Hirano, Tokyo, Japan

[73] Assignee: Asahi Kogaku Kogyo K.K., Tokyo, Japan

[21] Appl. No.: 551,357

[22] Filed: Jul. 12, 1990

[30] Foreign Application Priority Data

Jul. 12, 1989 [JP] Japan .................................. 1-179536

[51] Int. Cl.⁵ .............................................. G02B 9/12
[52] U.S. Cl. ...................................... 359/690; 359/689
[58] Field of Search ........................ 350/474, 475, 476

[56] References Cited

U.S. PATENT DOCUMENTS

| 3,418,039 | 12/1968 | Kingslake | 350/475 |
| 3,838,910 | 10/1974 | Ruben | 350/475 |
| 3,910,685 | 10/1975 | DeJager | 350/475 |
| 3,967,884 | 7/1976 | DeJager | 350/475 |
| 4,892,398 | 1/1990 | Kubo et al. | 350/475 |

FOREIGN PATENT DOCUMENTS

| 59-160118 | 9/1984 | Japan . |
| 60-177313 | 9/1985 | Japan . |
| 60-51091 | 11/1985 | Japan . |
| 63-180924 | 7/1988 | Japan . |
| 1-116614 | 5/1989 | Japan . |
| 1-128030 | 5/1989 | Japan . |
| 1-261614 | 10/1989 | Japan . |

*Primary Examiner*—Paul M. Dzierzynski
*Attorney, Agent, or Firm*—Sughrue, Mion, Zinn, Macpeak & Seas

[57] ABSTRACT

A copying lens system of a three-unit-three-element composition comprises, from either the object or image side, a positive meniscus first lens element that is convex toward the object or image side, a negative second lens element, and a positive third lens element, which lens system satisfies certain conditions, to obtain a copying lens system that has a simple and compact three-unit-three-element composition, that can be manufactured at a low cost by using inexpensive lens materials, and provides satisfactory performance over a broad zooming range of from about 0.3X to 2.0X.

6 Claims, 10 Drawing Sheets

COPYING LENS SYSTEM

BACKGROUND OF THE INVENTION

This invention relates to a copying lens system for use in a copier, etc. More particularly, this invention relates to a copying lens system that is capable of reduced, size-for-size and enlarged copying at ratios of from about 0.3X to 2.0X, that has brightness in the F-number range of from about 1:8 to 1:6:7 and that covers half-view angles ($\omega$) of from about 20 to 27 degrees.

With the recent demand for reducing the size and cost of copiers, a need has arisen for using smaller and less expensive copying lenses. Copying lens systems that have heretofore been proposed for meeting the need for reduction in size and cost include a four-unit-four-element symmetrical type that has an F number of about 1:5.6 as described in Japanese Patent Publication No. 51091/1985, as well as a three-unit-three-element asymmetric type that has an F number of about 1:8 as described in Unexamined Published Japanese Patent Application No. 180924/1988. However, the four-unit-four-element symmetrical type is still unsatisfactory in terms of size and cost. On the other hand, the lens system described in Unexamined Published Japanese Patent Application No. 180924/1988 which is of a three-unit-three-element composition consists of the necessary minimum number of lens elements and yet is capable of producing a flat image However, the lens elements used have such high refractive indices that the overall lens system is not completely satisfactory in terms of cost. Speaking of its performance, this lens system has an angle coverage ($2\omega$) of about 40 degrees and this should be expanded a little further without compromising the compactness of the system. In addition, currently available copying lens systems typically have a zooming range of 0.6X–1.4X and are incapable of meeting the need of consumers today for using their copiers in an expanded zooming range of from 0.5X to 2.0X and even from about 0.3X to 2.0X.

SUMMARY OF THE INVENTION

The present invention has been accomplished in order to solve the aforementioned problems of the prior art and its principal object is to provide a copying lens system that has a simple and compact three-unit-three-element composition, that can be manufactured at a lower cost by using inexpensive lens materials, and which yet insures satisfactory performance over a broad zooming range of from about 0.3X to 2.0X.

This object of the present invention can be attained by a copying lens system of a three-unit-three-element composition that comprises, from the object side, a positive meniscus first lens element that is convex toward the object, a negative second lens element, and a positive third lens element, which lens system satisfies the following conditions:

$$0.20 < \frac{f_3}{f_1} < 0.40 \quad (1)$$

$$1.70 < n_1 + \frac{\nu_1}{200} \leq 1.93 \quad (2)$$

$$0.60 < -\frac{r_3}{r_4} < 1.4 \quad (3)$$

$$1.65 < -\frac{r_5}{r_6} < 3.0 \quad (4)$$

$$0.4 < \frac{d_1}{d_T} < 0.6 \quad (5)$$

$$0.12 < \frac{d_T}{f} < 0.17 \quad (6)$$

In order to provide further improved performance, the copying lens system described above desirable satisfies the following condition:

$$0.08 < n_3 - n_1 \quad (7)$$

The symbols used in conditions (1)–(7) have the following respective meanings:
 f: the focal length of the overall system;
 $f_i$: the focal length of the ith lens;
 $n_i$: the refractive index of the ith lens at the d-line;
 $\nu_i$: the Abbe number of the ith lens;
 $r_j$: the radius of curvature of the jth surface;
 $d_j$: the distance between the jth surface and the (j+1)th surface;
 $d_T$: the length of the overall system.

In another preferred embodiment, the object plane of the copying lens system may be replaced by the image-forming plane and vice versa.

DETAILED DESCRIPTION OF THE PREFERRED EMBODIMENT

Figure 1:
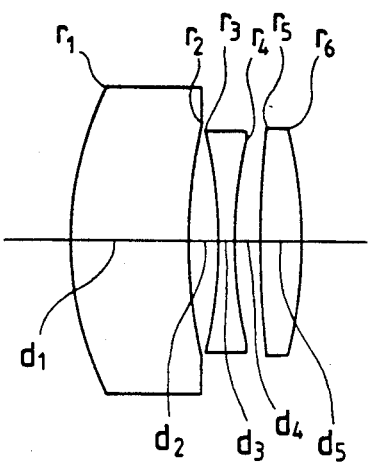
FIGS. 1, 5, 9, 13 and 17 are diagrammatic cross-sectional views of the lens systems constructed in Examples 1, 2, 3, 4 and 5, respectively, of the present invention.
Figure 2:
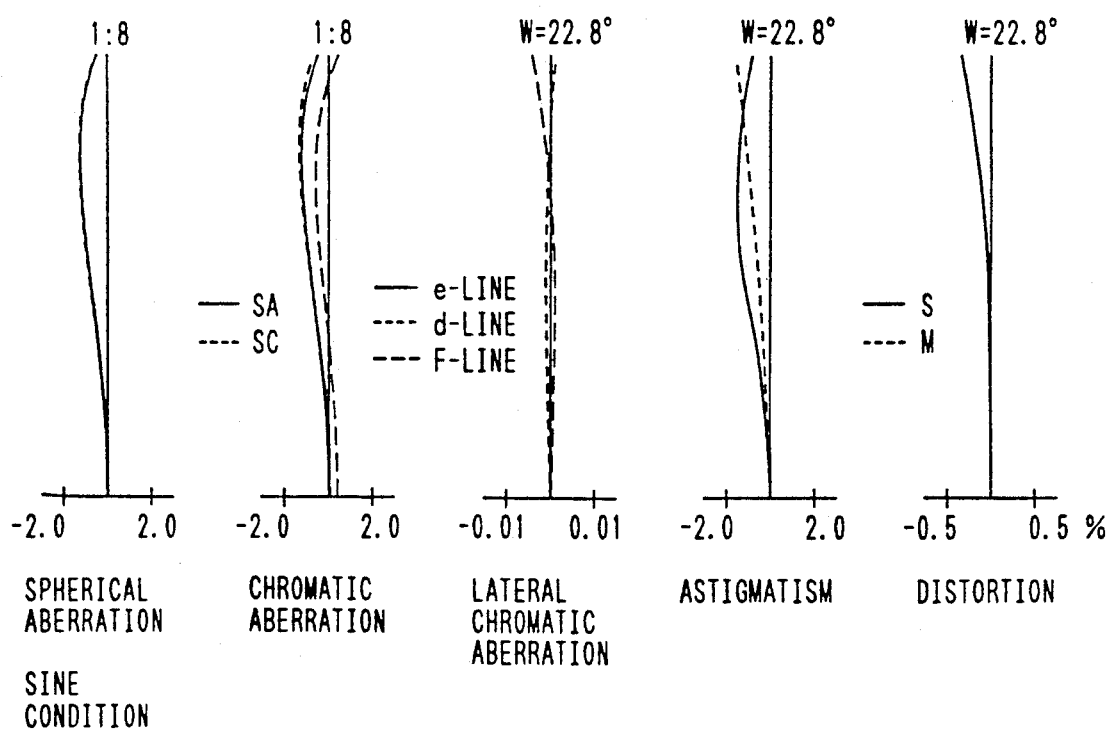
FIGS. 2, 6, 10, 14 and 18 are graphs plotting the aberration curves obtained at a magnification of 1.0× in Examples 1, 2, 3, 4 and 5, respectively, of the present invention.
Figure 3:
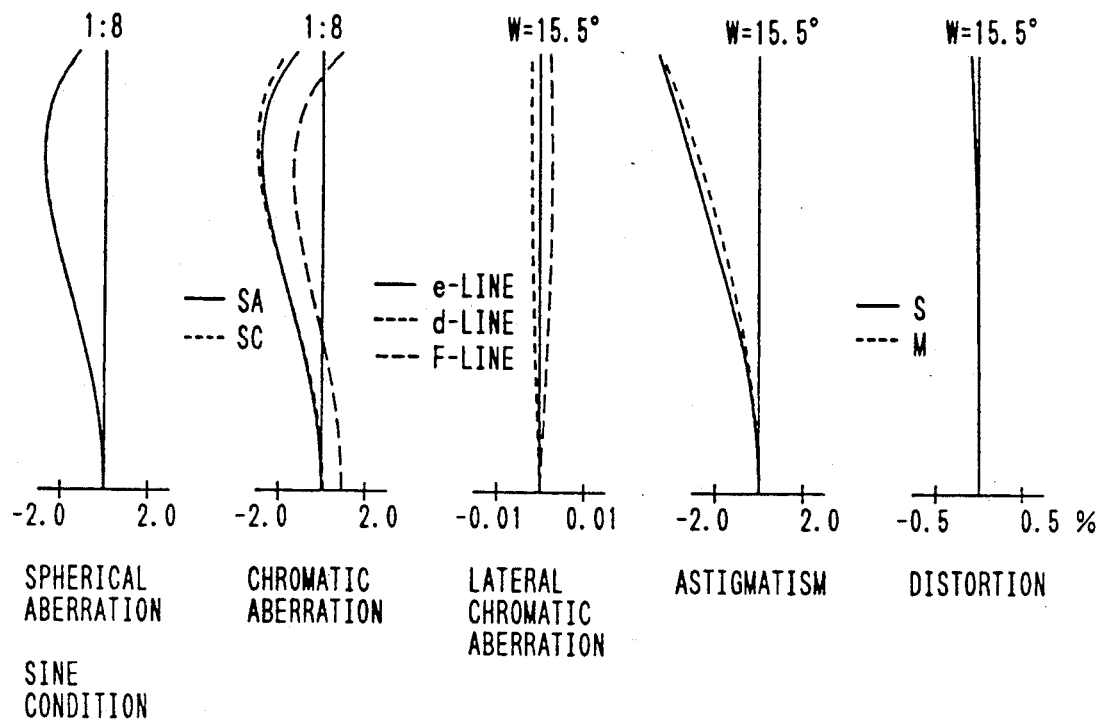
FIGS. 3, 7, 11, 15 and 19 are graphs plotting the aberration curves obtained at a magnification of 2.0× in Examples 1, 2, 3, 4 and 5, respectively, of the present invention.
Figure 4:
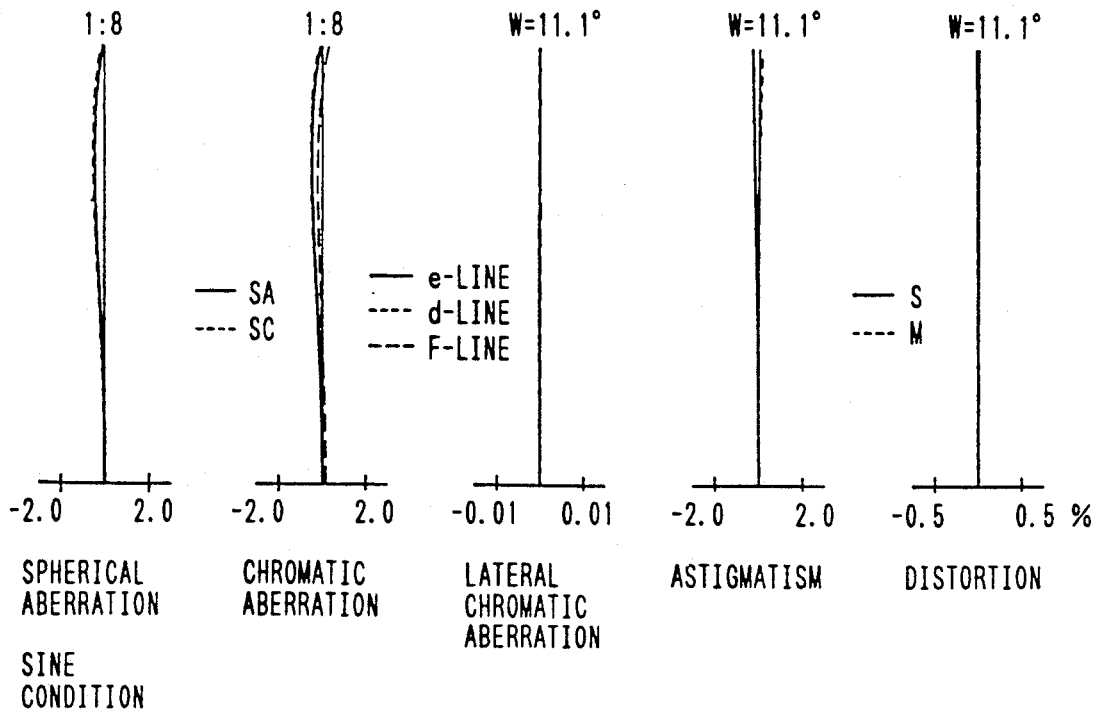
FIGS. 4, 8, 12, 16 and 20 are graphs plotting the aberration curves obtained at a magnification of 0.3× in Examples 1, 2, 3, 4 and 5, respectively, of the present invention.
Figure 5:
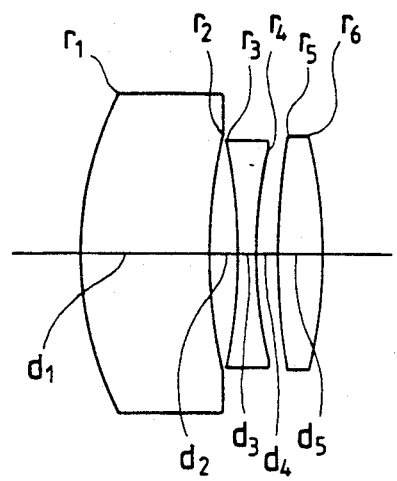
Figure 6:
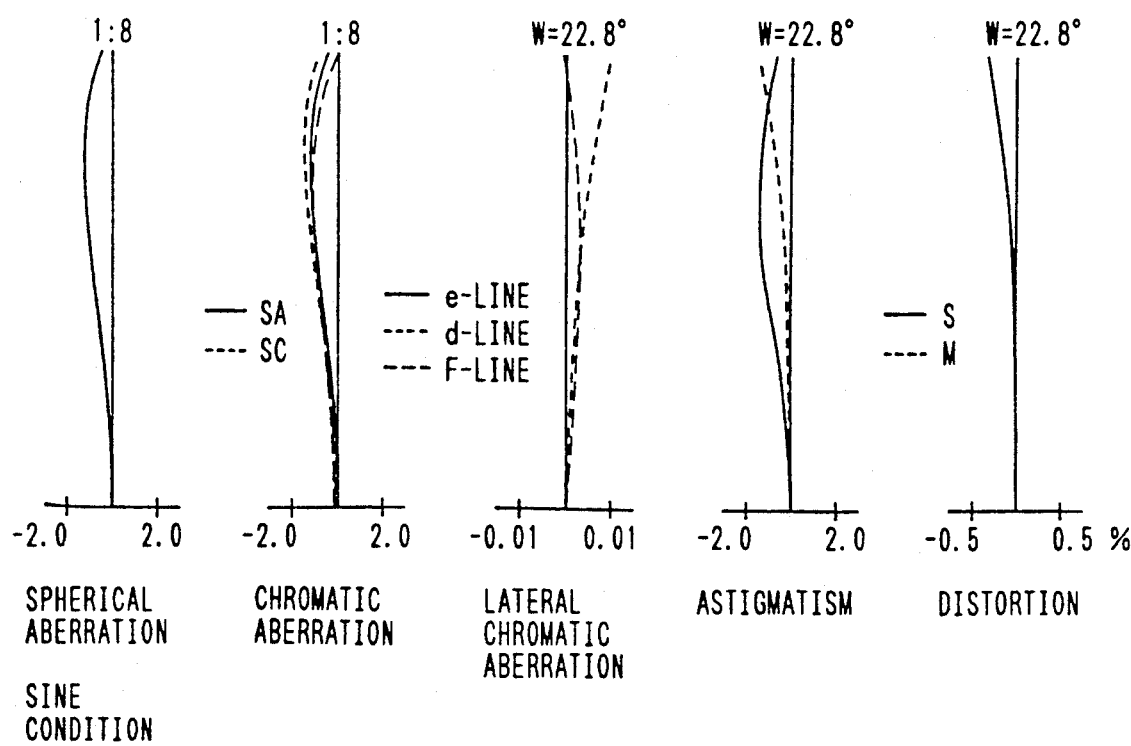
Figure 7:
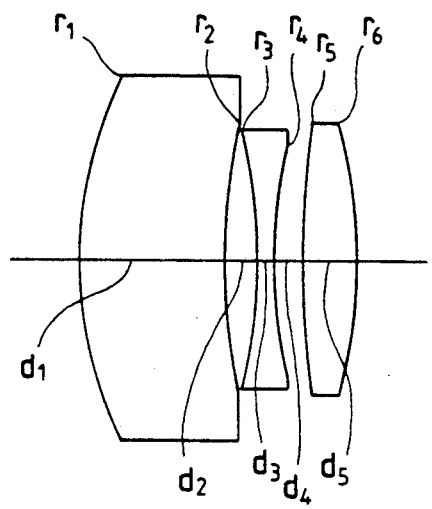
Figure 8:
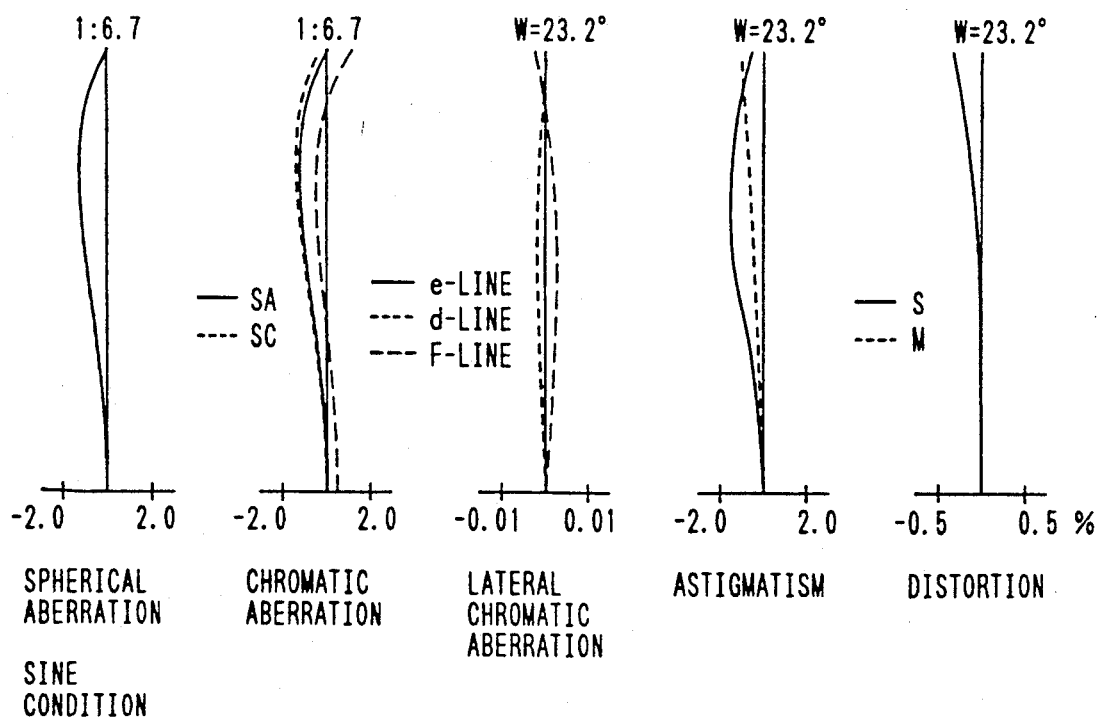
Figure 9:
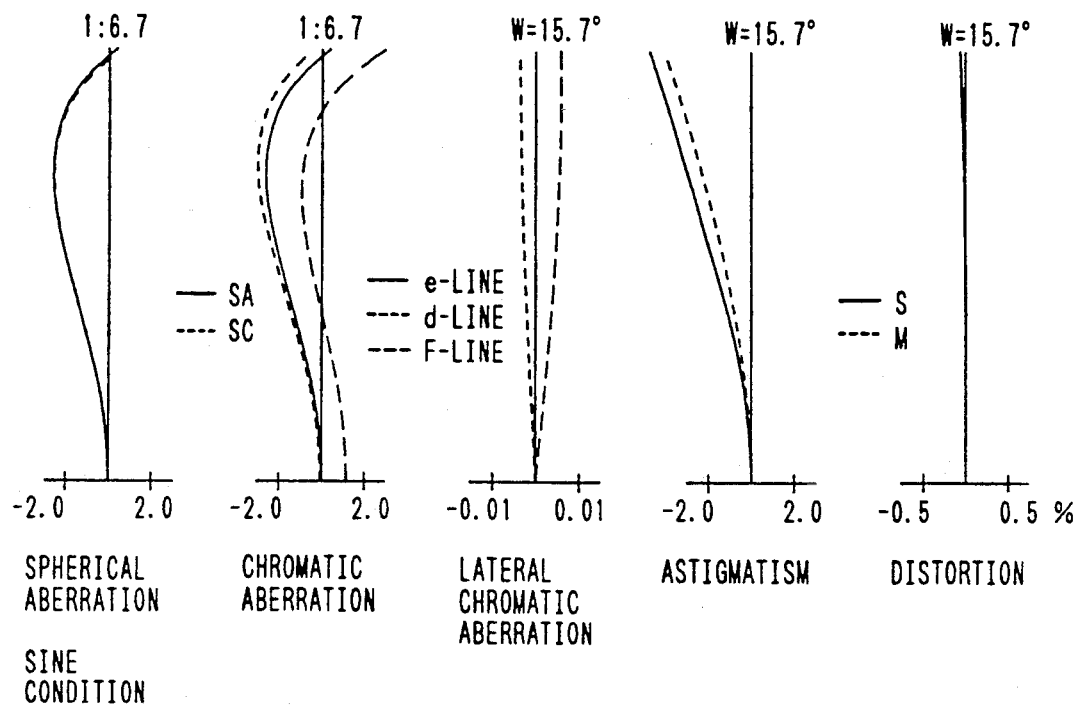
Figure 10:
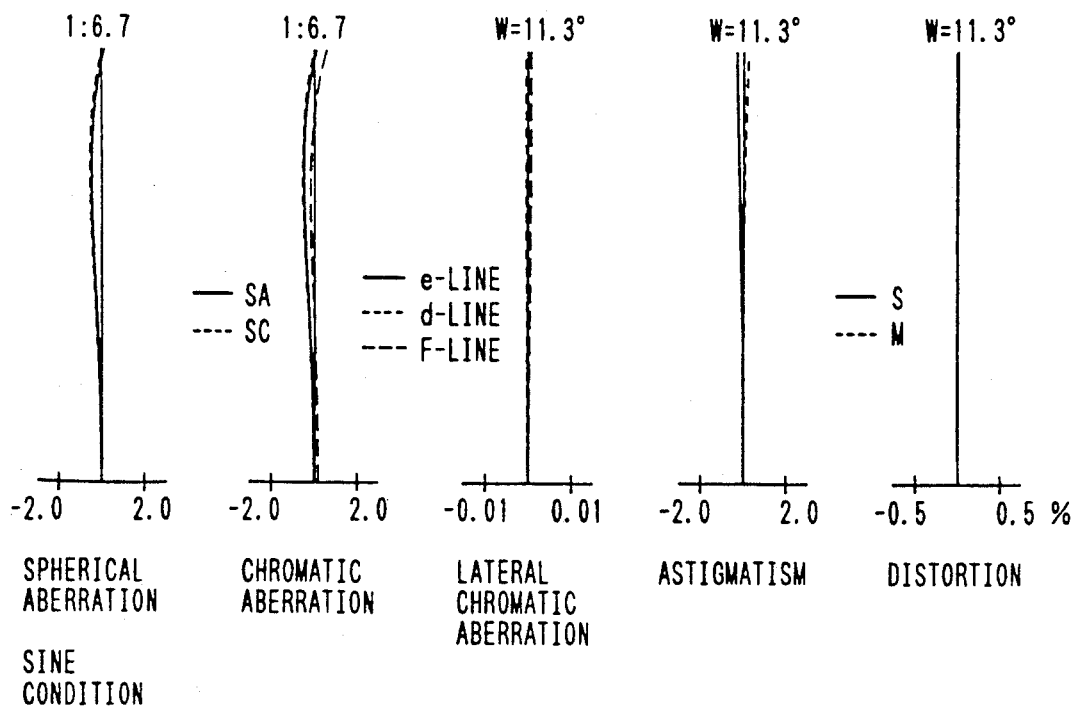
Figure 11:
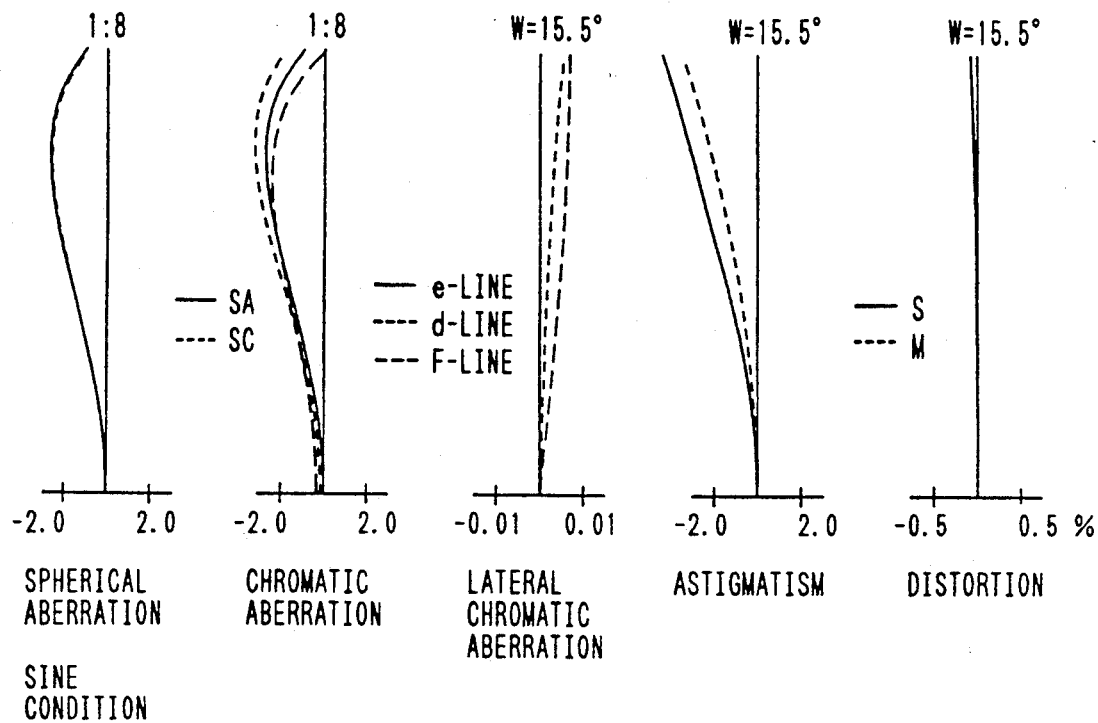
Figure 12:
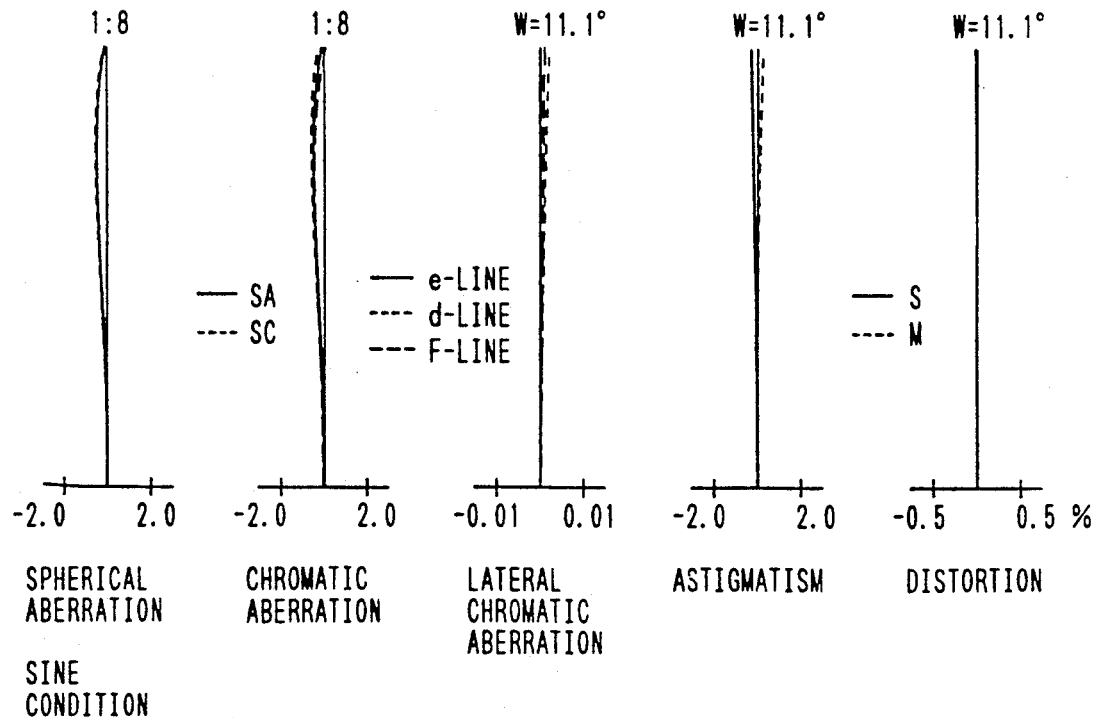
Figure 13:
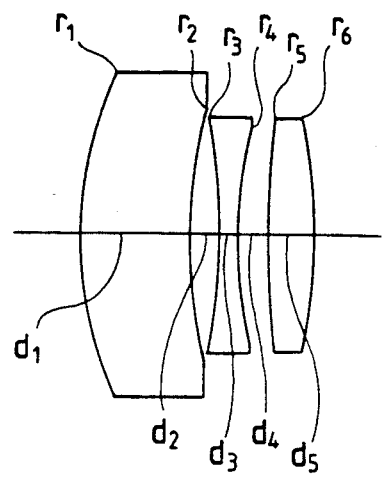
Figure 14:
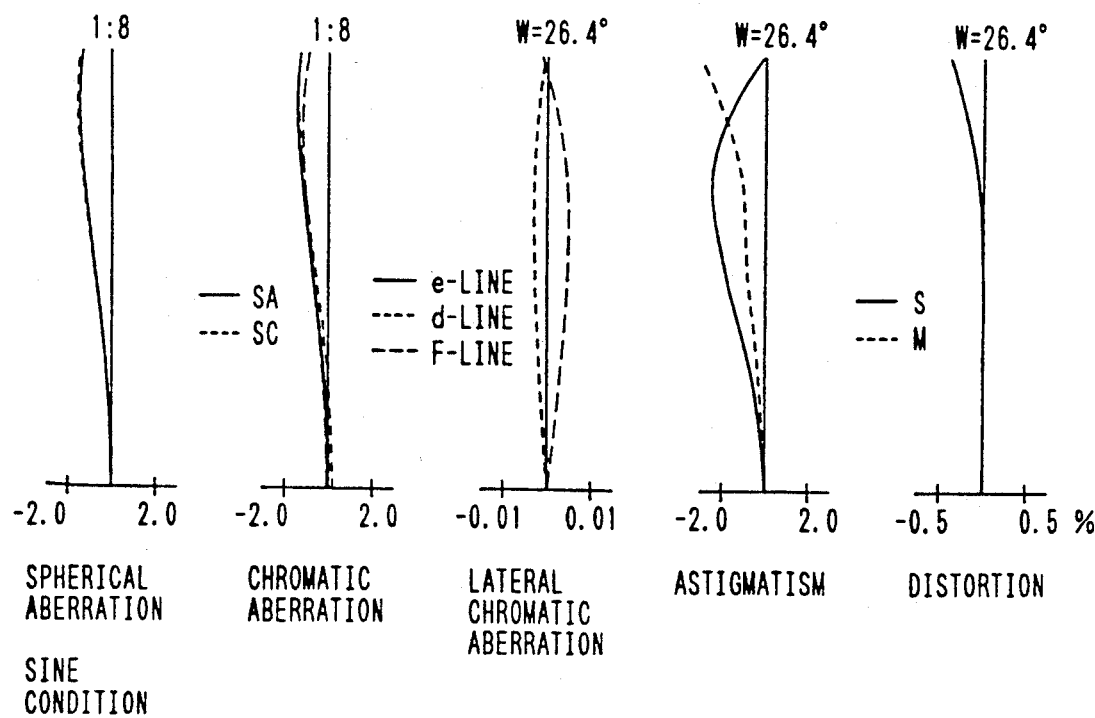
Figure 15:
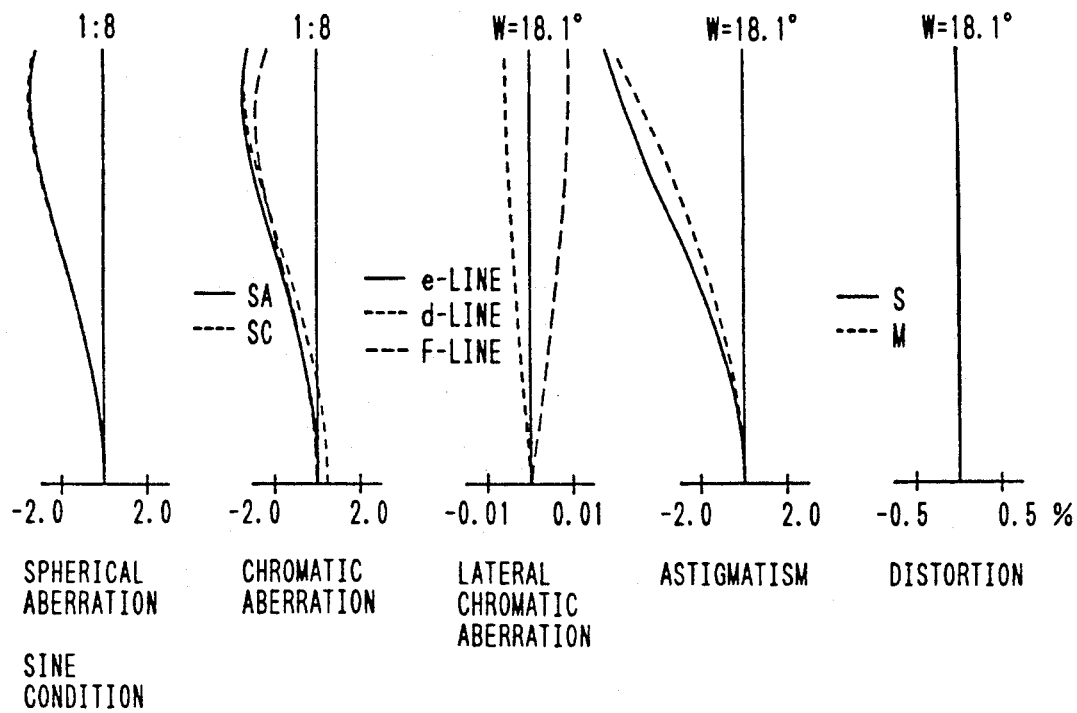
Figure 16:
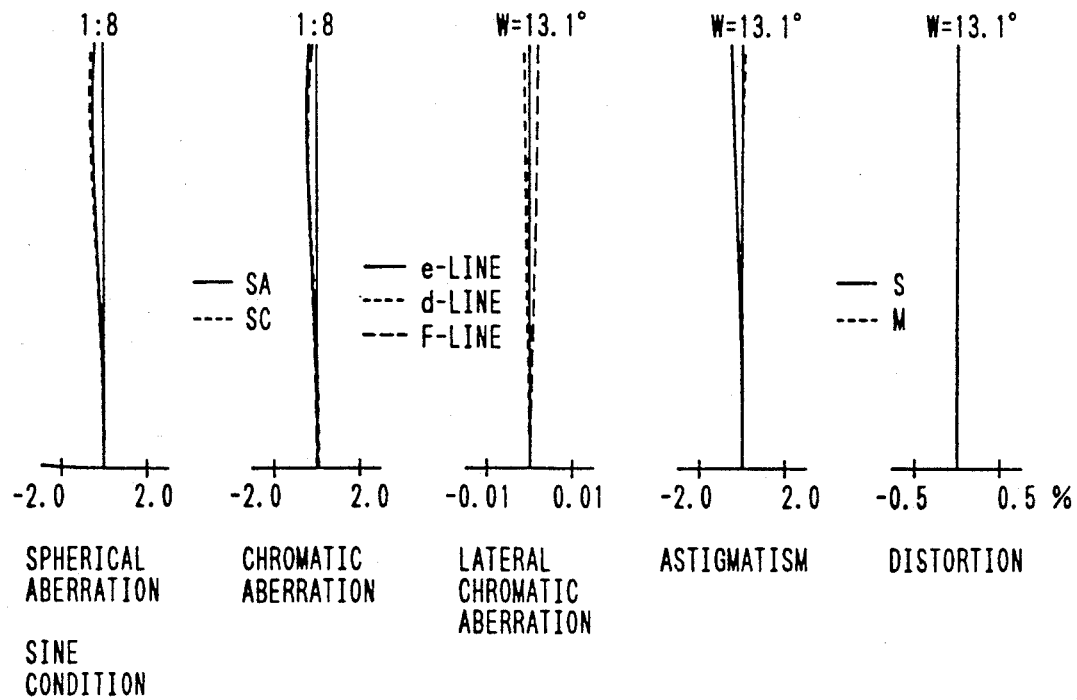
Figure 17:
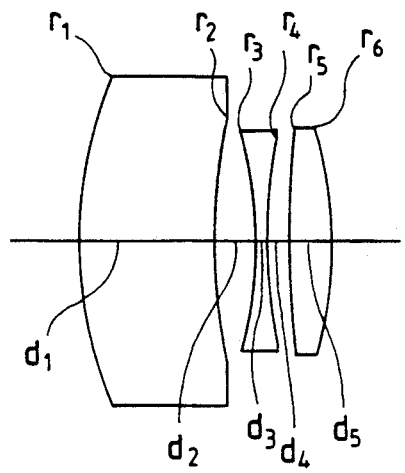
Figure 18:
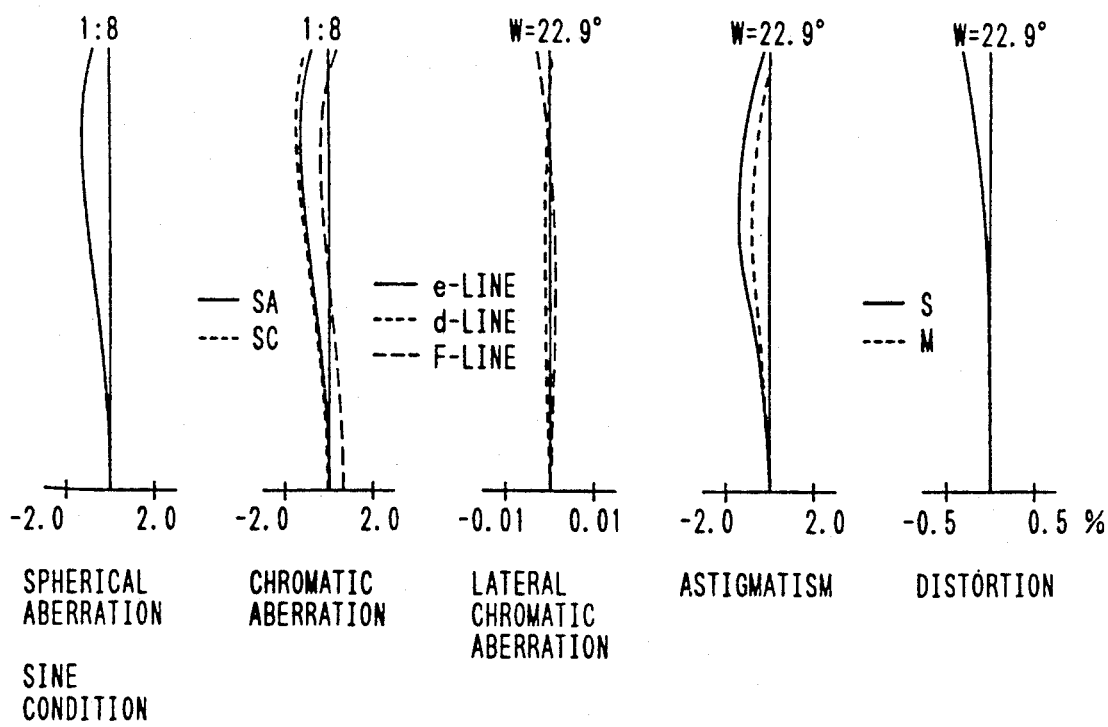
Figure 19:
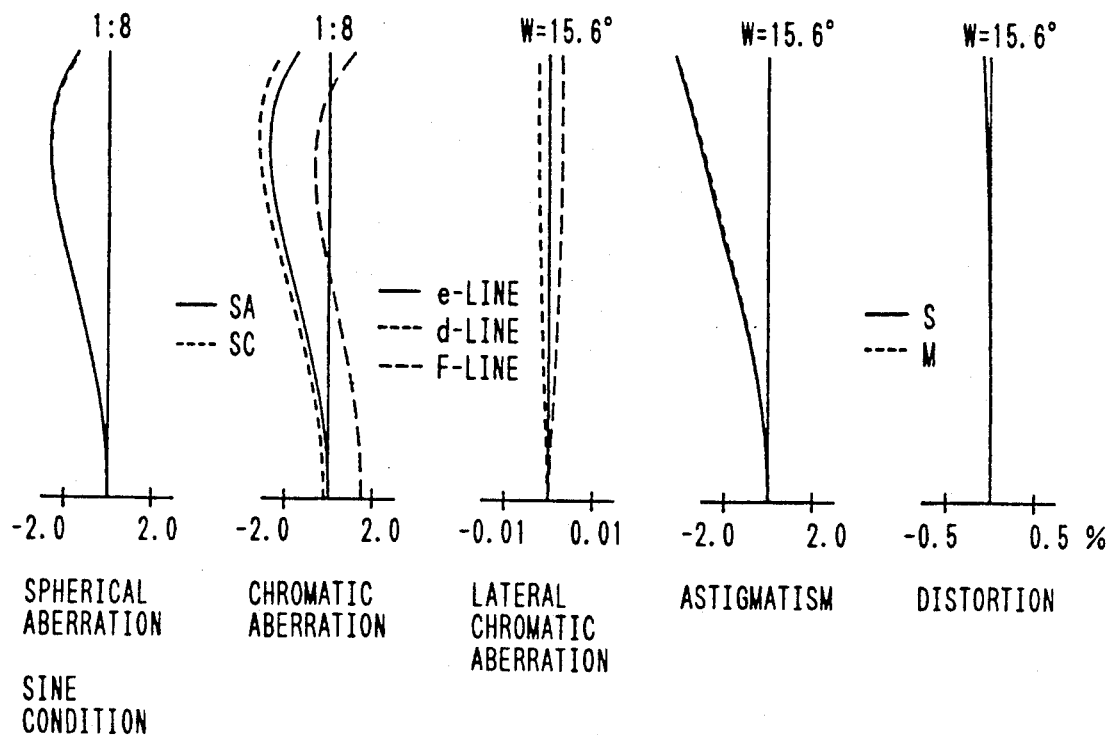
Figure 20:
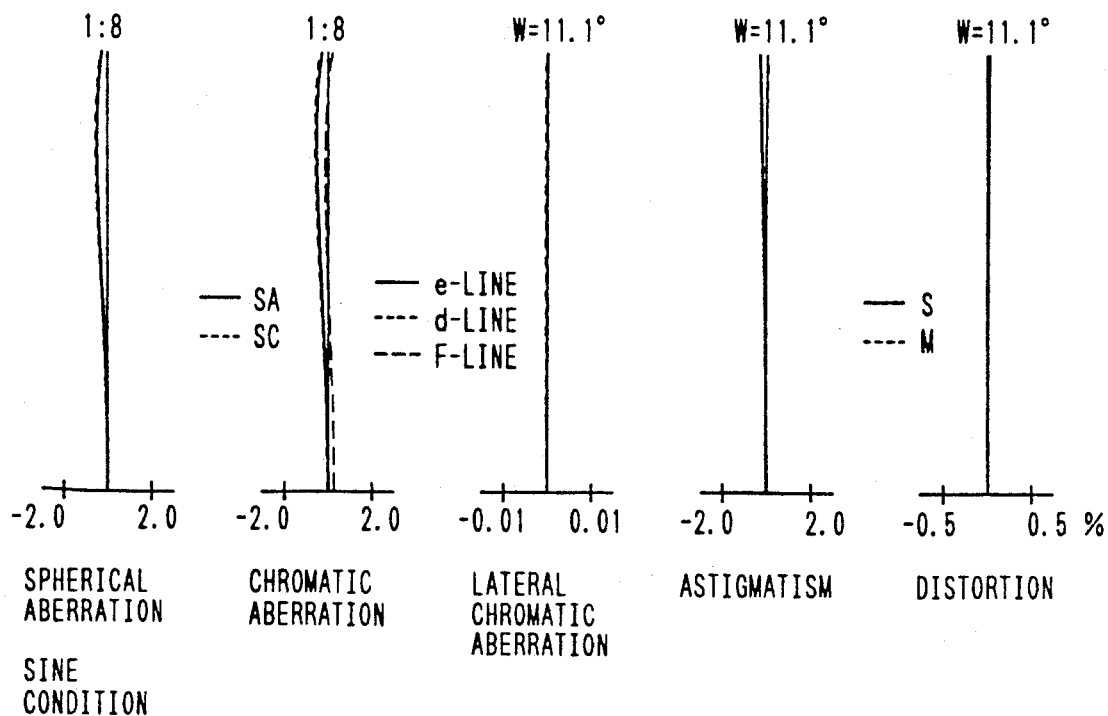

The conditions to be satisfied by the lens system of the present invention are described below in seriatim.

Condition (1) relates to the ratio of the focal length of the third lens element to that of the first lens element If the lower limit of this condition is not reached, the power of the first lens element decreases and the power of the third lens element accordingly increases and, as a result, the optical burden on the third lens element becomes too large to achieve effective compensation for aberrations. If, on the other hand, the upper limit of condition (1) is exceeded, the power of the first lens element becomes so great that in order to achieve compensation for aberrations in a balanced way, a lens material having high refractive index must be used in place of inexpensive lens materials.

Condition (2) relates to the refractive index and the Abbe number of the first lens element. If the upper limit of this condition is exceeded, the refractive index of the first lens element increases, which is favorable for the purpose of aberrational compensation. However, this is not preferred from an economic viewpoint since it becomes difficult to use inexpensive lens materials. If, on the other hand, the lower limit of condition (2) is not reached, the refractive index of the first lens element becomes so low that considerable difficulty is involved in achieving efficient aberrational compensation.

Condition (3) relates to the shape of the second lens element. If the upper limit of this condition is exceeded, the curvature radius of the second surface of the second lens element ($r_4$) becomes too small to effectively reduce spherical aberration and coma. If, on the other hand, the lower limit of condition (3) is not reached, not only is spherical aberration overcompensated but it also becomes difficult to compensate for astigmatism in a way balanced with other aberrations.

Condition (4) relates to the shape of the third lens element. If the upper limit of this condition is exceeded, the coma that develops at the second surface of the second lens element ($r_4$) is undercompensated by the third lens element. If, on the other hand, the lower limit of condition (4) is not reached, overcompensation by the third lens element will occur.

Condition (5) relates to the ratio of the thickness of the first lens element to the overall length of the system. If the lower limit of this condition is not reached, it becomes difficult to compensate for coma. If, on the other hand, the upper limit of condition (5) is exceeded, the second lens element becomes so thin that difficulty is involved in its machining. Further, the third lens element becomes so close in shape to a planoconvex lens in order to insure the desired thickness at lens edge that increased aberration will develop in the second surface ($r_6$) of the third lens element to make it difficult to achieve compensation for various aberrations in a balanced way.

Condition (6) relates to the ratio of the overall length of the system to the focal length of the overall system. If the upper limit of this condition is exceeded, the overall length of the system increases so much that the principal object of the present invention will not be attained. If, on the other hand, the lower limit of condition (6) is not reached, it becomes difficult to compensate for various aberrations in a balanced way.

Condition (7) relates to the difference between the refractive index of the third lens element and that of the first lens element. If this condition is not satisfied, the refractive index of the third lens element becomes too low to achieve effective compensation for the aberration that develops in it.

In the copying lens system of the present invention, the first, second and third lens elements are positioned asymmetrically, and the distance between the object plane and the first surface ($r_1$) of the first lens element differs from the distance between the final surface ($r_6$) and the image-forming plane. Hence, the latitude in mechanical design layout can be increased by changing the object plane for the image-forming plane and vice versa.

EXAMPLES

Five examples of the present invention are described below with reference to data sheets, in which $F_{NO}$ denotes the aperture ratio, f, the focal length of the overall system, $\omega$, the half view angle, r, the radius of curvature of an individual lens surface, d, the thickness of an individual lens element or the aerial distance between adjacent lenses, n, the refractive index of an individual lens element at the d-line, and $\nu$, the Abbe number of an individual lens element. Conditions (1)–(7) were calculated with reference to the e-line.

EXAMPLE 1

| Surface No. | $F_{NO}$ = 1:8 | f = 100.00 | $\omega$ = 22.8° | |
|---|---|---|---|---|
| | r | d | n | $\nu$ |
| 1 | 20.233 | 6.902 | 1.51633 | 64.1 |
| 2 | 30.144 | 1.721 | | |
| 3 | −27.343 | 1.007 | 1.58144 | 40.7 |
| 4 | 27.343 | 1.414 | | |
| 5 | 48.017 | 2.428 | 1.69100 | 54.8 |
| 6 | −27.309 | | | |

(1) $f_3/f_1 = 0.26$ (2) $n_1 + \dfrac{\nu_1}{200} = 1.84$ (3) $-\dfrac{r_3}{r_4} = 1.00$ (4) $-\dfrac{r_5}{r_6} = 1.76$ (5) $d_1/d_T = 0.51$
(6) $d_T/f = 0.13$
(7) $n_3 - n_1 = 0.17$

EXAMPLE 2

| Surface No. | $F_{NO}$ = 1:8 | f = 100.00 | $\omega$ = 22.8° | |
|---|---|---|---|---|
| | r | d | n | $\nu$ |
| 1 | 19.735 | 7.240 | 1.49136 | 57.8 |
| 2 | 30.331 | 1.656 | | |
| 3 | −28.235 | 1.007 | 1.63980 | 34.5 |
| 4 | 28.235 | 1.373 | | |
| 5 | 49.660 | 2.391 | 1.74400 | 44.8 |
| 6 | −27.644 | | | |

(1) $f_3/f_1 = 0.25$ (2) $n_1 + \dfrac{\nu_1}{200} = 1.78$ (3) $-\dfrac{r_3}{r_4} = 1.00$ (4) $-\dfrac{r_5}{r_6} = 1.80$ (5) $d_1/d_T = 0.53$
(6) $d_T/f = 0.14$
(7) $n_3 - n_1 = 0.25$

EXAMPLE 3

| Surface No. | $F_{NO}$ = 1:6.7 | f = 100.00 | $\omega$ = 23.2° | |
|---|---|---|---|---|
| | r | d | n | $\nu$ |
| 1 | 23.662 | 8.418 | 1.58913 | 61.2 |
| 2 | 36.430 | 2.003 | | |
| 3 | −30.805 | 1.033 | 1.60342 | 38.0 |
| 4 | 30.370 | 1.686 | | |
| 5 | 55.410 | 3.238 | 1.69350 | 53.2 |
| 6 | −29.366 | | | |

(1) $f_3/f_1 = 0.30$ (2) $n_1 + \dfrac{\nu_1}{200} = 1.90$

-continued (3) $-\dfrac{r_3}{r_4} = 1.01$ (4) $-\dfrac{r_5}{r_6} = 1.89$ (5) $d_1/d_T = 0.51$
(6) $d_T/f = 0.16$
(7) $n_3 - n_1 = 0.10$

EXAMPLE 4

| Surface No. | $F_{NO} = 1:8$ $\quad$ f = 100.00 $\quad$ ω = 26.4° | | | |
|---|---|---|---|---|
| | r | d | n | ν |
| 1 | 20.772 | 6.533 | 1.58913 | 61.2 |
| 2 | 32.678 | 1.667 | | |
| 3 | −35.517 | 1.119 | 1.58144 | 40.7 |
| 4 | 27.107 | 1.801 | | |
| 5 | 55.667 | 2.629 | 1.67790 | 55.3 |
| 6 | −32.219 | | | |

(1) $f_3/f_1 = 0.38$ (2) $n_1 + \dfrac{\nu_1}{200} = 1.89$ (3) $-\dfrac{r_3}{r_4} = 1.31$ (4) $-\dfrac{r_5}{r_6} = 1.73$ (5) $d_1/d_T = 0.48$
(6) $d_T/f = 0.14$
(7) $n_3 - n_1 = 0.09$

EXAMPLE 5

| Surface No. | $F_{NO} = 1:8$ $\quad$ f = 100.00 $\quad$ ω = 22.9° | | | |
|---|---|---|---|---|
| | r | d | n | ν |
| 1 | 23.714 | 7.849 | 1.51633 | 64.1 |
| 2 | 36.411 | 2.446 | | |
| 3 | −22.745 | 0.667 | 1.60717 | 40.3 |
| 4 | 34.745 | 1.267 | | |
| 5 | 62.626 | 2.437 | 1.72916 | 54.7 |
| 6 | −23.848 | | | |

(1) $f_3/f_1 = 0.22$ (2) $n_1 + \dfrac{\nu_1}{200} = 1.84$ (3) $-\dfrac{r_3}{r_4} = 0.66$ (4) $-\dfrac{r_5}{r_6} = 2.63$ -continued (5) $d_1/d_T = 0.54$
(6) $d_T/f = 0.15$
(7) $n_3 - n_1 = 0.21$ As described above, the present invention provides a copying lens system that adopts a compact and inexpensive configuration and which yet insures satisfactory performance over a broad range of zooming ratios from about 0.3× to 2.0× in combination with a wide coverage of half view angles (ω) of at least 20 degrees.

What is claimed is:

1. A copying lens system of a three-unit-three-element composition that comprises, from a first side thereof, a positive meniscus first lens element that is convex toward said first side, a negative second lens element, and a positive third lens element, which lens system satisfies the following conditions:

$$0.20 < \dfrac{f_3}{f_1} < 0.40 \qquad (1)$$

$$1.70 < n_1 + \dfrac{\nu_1}{200} \leq 1.93 \qquad (2)$$

$$0.60 < -\dfrac{r_3}{r_4} < 1.4 \qquad (3)$$

$$1.65 < -\dfrac{r_5}{r_6} < 3.0 \qquad (4)$$

$$0.4 < \dfrac{d_1}{d_T} < 0.6 \qquad (5)$$

$$0.12 < \dfrac{d_T}{f} < 0.17 \qquad (6)$$

where
f: the focal length of the overall system;
$f_i$: the focal length of the ith lens;
$n_i$: the refractive index of the ith lens at the d-line;
$\nu_i$: the Abbe number of the ith lens;
$r_j$: the radius of curvature of the jth surface;
$d_j$: the distance between the jth surface and the (j+1)th surface;
$d_T$: the length of the overall system.

2. A copying lens system according to claim 1 which further satisfies the following condition:

$$0.08 < n_3 - n_1 \qquad (7)$$

3. A copying lens system according to claim 1 wherein said first side is an object side.

4. A copying lens system according to claim 2 wherein said first side is an object side.

5. A copying lens system according to claim 1 wherein said first side is an image side.

6. A copying lens system according to claim 2 said first side is an image side.

* * * * *